H. L. PRATT,

Assignor, by mesne assignments, to MILLER'S FALLS Co.

Bit-Stock.

No. 8,525. Reissued Dec. 17, 1878.

Witnesses.
W. B. Thomson
P. J. Moseley.

Inventor.
Henry L. Pratt
By James Shepard Atty.

N. PETERS, PHOTO-LITHOGRAPHER, WASHINGTON, D. C.

UNITED STATES PATENT OFFICE.

HENRY L. PRATT, OF BROOKLYN, N. Y., ASSIGNOR, BY MESNE ASSIGNMENTS, TO MILLER'S FALLS CO., OF EWING, MASS.

IMPROVEMENT IN BIT-STOCKS.

Specification forming part of Letters Patent No. 131,829, dated October 1, 1872; Reissue No. 8,525, dated December 17, 1878; application filed November 7, 1878.

*To all whom it may concern:*

Be it known that I, HENRY L. PRATT, of Brooklyn, in the county of Kings and State of New York, have invented certain Improvements in Bit-Stocks, of which the following is a full description:

My said improvements consist in the novel constructions, combinations, and arrangements of parts which have for their object an efficient tool-holder, as hereinafter described.

Figure 1:
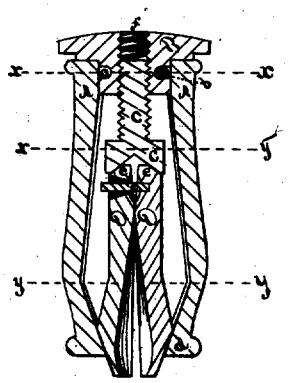
Figure 2:
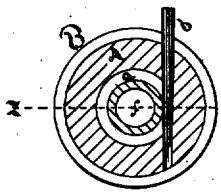
Figure 3:
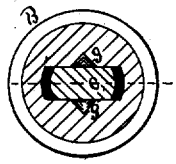
Figure 4:
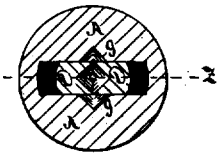
Figure 5:
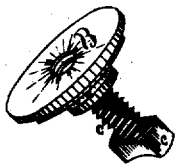
Figure 6:
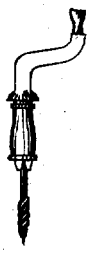

In the sheet of drawings annexed, Figure 1 is a longitudinal section taken along the line *z z*, cutting Figs. 2, 3, and 4. Fig. 2 is a transverse section through *x x* of Fig. 1. Fig. 3 is a transverse section through *x y* of Fig. 1. Fig. 4 is a transverse section through *y y* of Fig. 1. Fig. 5 is a perspective view of the screw-button B and the foot-piece C, hereinafter described; and Fig. 6 shows my improvements attached to a brace.

I will now describe my invention.

A represents a socket, which is provided with a slot, of such shape as to receive and admit of the longitudinal movement of a pair of wedge-shaped jaws, D D, which slot may be enlarged laterally, as shown at *g g*, to receive the corners of the tang of the bits or tool when the same is grasped by the jaws. This socket is provided with inclines at its outer end, and at the opposite end is provided with a button, B, which will be described.

The jaws D D are provided with longitudinal grooves to inclose the corners of the tang, as shown clearly in Fig. 1, and they are pivoted together at their smaller ends in such a manner that the jaws will swing open to receive the inserted tang. These jaws are wedge-shaped, as already stated, in order that when acted upon by the inclines at the mouth of the socket they may be closed together upon the tang. They also rest in a depression in a foot-piece, C, which foot-piece has a longitudinal movement in the interior of the socket, and is threaded so as to be actuated by the rotating button B. This foot-piece and button act together to cause the longitudinal movement of the former, and for that purpose one is provided with a male and the other with a female screw. This button B is provided with a cylindrical plug, fitting in a corresponding cavity in the upper end of the socket A. This cylindrical plug has an annular groove extending around it to receive a retaining-pin, *b*, which holds it in position within the socket A.

By this arrangement no longitudinal movement is permitted to the button B, while at the same time the latter is free to rotate relatively to the socket, and thereby actuate the threaded foot-piece, and through it the companion grasping-jaws.

The operation of this holder is as follows: The operator holds the socket A firmly in one hand. With the other hand he turns the button B. Immediately a longitudinal movement is given to the threaded foot-piece, and the inclines of the wedge-shaped jaws are moved longitudinally along the inclines in the mouth of the socket, whereby the jaws are made to close upon the shank of the tool and gripe it firmly.

It is obvious that by reversing the operation the jaws will separate and permit the tool to be readily removed. The jaws D D open automatically, their large ends falling apart into the longitudinal grooves of the socket A.

Having thus described my invention, and disclaiming all devices in which the actuating screw-thread is upon the exterior of the socket within which the jaws are located, I desire to secure by Letters Patent—

1. In a bit-brace, a pair of longitudinally-moving jaws, in combination with a foot-piece located at the inner end of said jaws, and an actuating-button, the foot-piece and button being adapted to impart a longitudinal movement to the jaws by a rotary movement of the button, substantially as described, and for the purpose specified.

2. In a bit-brace, the actuating-button provided with a cylindrical plug having an annular groove, in combination with the inner end of the socket, the retaining-pin, and foot-piece, adapted to act upon the jaws, substantially as described, and for the purpose specified.

3. In a bit-brace, a socket provided with inclines to close the jaws, an actuating-button, B, a threaded foot-piece, and wedge-shaped companion jaws, substantially as and for the purpose specified.

HENRY L. PRATT.

Witnesses:

E. P. STOUGHTON,

C. A. ASHMEAD.